(12) United States Patent
Lim et al.

(10) Patent No.: US 11,333,866 B2
(45) Date of Patent: May 17, 2022

(54) ADAPTOR LENS FOR INCREASING MAGNIFICATION OF SCOPE AND SIGHT COMPRISING THE SAME

(71) Applicant: SU optics Co., Ltd., Changwon (KR)

(72) Inventors: Do Hyeon Lim, Changwon (KR); Sang Ik Lee, Incheon (KR); KeeUk Jeon, Seoul (KR)

(73) Assignee: SU optics Co., Ltd., Changwon (KR)

(*) Notice: Subject to any disclaimer, the term of this patent is extended or adjusted under 35 U.S.C. 154(b) by 89 days.

(21) Appl. No.: 16/817,426

(22) Filed: Mar. 12, 2020

(65) Prior Publication Data
US 2021/0088771 A1    Mar. 25, 2021

(30) Foreign Application Priority Data

Sep. 20, 2019    (KR) .................. 10-2019-0115850

(51) Int. Cl.
*G02B 15/10*    (2006.01)
*G02B 15/16*    (2006.01)
*G02B 23/24*    (2006.01)

(52) U.S. Cl.
CPC ............. *G02B 15/10* (2013.01); *G02B 15/16* (2013.01); *G02B 23/2438* (2013.01)

(58) Field of Classification Search
CPC ................................ G02B 15/02; G02B 15/10
See application file for complete search history.

(56) References Cited

U.S. PATENT DOCUMENTS

| 4,929,068 | A | * | 5/1990 | Tsuji | ........................ | G02B 15/10 |
| | | | | | | 359/673 |
| 2005/0259328 | A1 | * | 11/2005 | Miyazawa | ............. | G02B 15/10 |
| | | | | | | 359/673 |
| 2011/0292518 | A1 | * | 12/2011 | Kim | ........................ | G02B 15/12 |
| | | | | | | 359/673 |
| 2019/0317299 | A1 | * | 10/2019 | Kim | ........................ | G02B 15/06 |

* cited by examiner

*Primary Examiner* — Darryl J Collins
(74) *Attorney, Agent, or Firm* — Heedong Chae; Lucem, PC

(57) ABSTRACT

Disclosed are an adaptor lens for increasing a magnification of a scope and a sight comprising the same. The adaptor lens for increasing a magnification of a scope of the present invention comprises: an adapter lens body detachably coupled to a sight main body having an objective lens group; a convex lens part provided in the adapter lens body so as to be disposed in front of the objective lens group; and a concave lens part provided in the adapter lens body and disposed between the convex lens part and the objective lens group.

8 Claims, 10 Drawing Sheets

ADAPTOR LENS FOR INCREASING MAGNIFICATION OF SCOPE AND SIGHT COMPRISING THE SAME

CROSS-REFERENCE TO RELATED APPLICATIONS

This application claims the priority of Korean Patent Application No. 10-2019-0115850 filed on Sep. 20, 2019, in the Korean Intellectual Property Office, the disclosure of which is incorporated herein by reference.

BACKGROUND OF THE INVENTION

Field of the Invention

The present invention relates to a sight and more particularly, to an adaptor lens for increasing a magnification of a scope and a sight comprising the same, which is attached to a scope product with a low magnification to implement a higher magnification through magnification conversion extended by a predetermined magnification increase amount.

Description of the Related Art

A sight consisting of a telescopic system may refer to as a lens system that may be mounted on the body of a firearm to magnify and observe a long-range object to be targeted and may be a device of a single-magnification optical system magnified with a single magnification or a zoom lens system fabricated to be seen while varying the magnification within a predetermined range.

FIG. 1 illustrates a lens configuration of a zoom lens system of a sight, which includes an objective lens group 10, a relay lens group 20, an eyepiece group 40, and a first focusing position 11 where a beam from the objective lens is primarily imaged and a second focusing position 30 where a beam from the relay lens is secondarily imaged, wherein a first a first focal plane (r6 plane) and a second focal plane (r15 plane) are present at these positions, respectively.

A beam emitted from the object passes through the objective lens group 10 and then is primarily focused or imaged on the first focal plane (r6 plane), passes through a condensing lens 12 condensing the beam that is spread and directed after focusing and a first erecting lens 13 and a second erecting lens zooming the image while erecting the image, and is secondarily focused on the second focal plane.

The secondary focused beam is imaged on the retina of the eye by the eyepiece group 40.

A mesh line in which a pattern is engraved may be located at any one of the first focal plane (r6 plane) and the second focal plane (r15 plane).

In the sight optical system consisting of the aforementioned configuration, as illustrated in FIG. 2, the first erecting lens 13 and the second erecting lens 14 perform a CAM operation according to Curve 1 and Curve 2, respectively, and while distances d8, d11, and d14 among three lenses are appropriately changed according to the CAM operation, the zooming is realized in predetermined magnification sections of 1.5× to 4.0×.

Table 1 shows lens design data for the aforementioned sight optical system, which can be seen as a typical sight lens optical system that implements about 2.7× zoom of 1.5× to 4.0×.

TABLE 1

| Plane No. | Radius of curvature (mm) | Thickness or Distance (mm) | Effective radius (mm) | Refractive index | Dispersion coefficient |
|---|---|---|---|---|---|
| r1 | 37.890 | 4.500 | 12 | 1.487 | 70.0 |
| r2 | −101.000 | 2.500 | 12 | | |
| r3 | 30.630 | 5.500 | 11 | 1.497 | 82.0 |
| r4 | −50.290 | 1.600 | 12 | 1.723 | 38.0 |
| r5 | 53.550 | 42.020 | 10 | | |
| r6 | ∞ (First focal plane) | 15.950 | 5.62 | | |
| r7 | −115.600 | 3.500 | 5.8 | 1.638 | 55.0 |
| r8 | −25.510 | (d8) 28.044 | 6 | | |
| r9 | 22.450 | 1.100 | 5.2 | 1.728 | 28.0 |
| r10 | 11.470 | 4.000 | 6 | 1.517 | 64.0 |
| r11 | −34.580 | (d11) 24.511 | 5.1 | | |
| r12 | −295.300 | 4.000 | 5 | 1.517 | 64.0 |
| r13 | −12.470 | 1.100 | 6 | 1.670 | 47.0 |
| r14 | −23.960 | (d14) 32.516 | 5.3 | | |
| r15 | ∞ (Second focal plane) | 30.160 | 7.72 | | |
| r16 | −60.630 | 2.500 | 12.1 | 1.689 | 31.0 |
| r17 | 32.130 | 12.000 | 15.5 | 1.517 | 64.0 |
| r18 | −32.130 | 2.500 | 14.6 | | |
| r19 | 60.400 | 6.000 | 15.7 | 1.517 | 64.0 |
| r20 | −60.400 | 83.813 | 15.7 | | |

| Distance No. | 1.5× | 2.75× | 4.0× |
|---|---|---|---|
| d8 | 28.044 | 9.598 | 3.517 |
| d11 | 24.511 | 18.964 | 4.762 |
| d14 | 32.516 | 56.508 | 76.791 |

A sight consisting of aforementioned sight optical system (including a telescopic system) may be observed by the user only at a predetermined magnification given by the optical system. In particular, since a low-magnification sight optical system may be observed only at a lower magnification, in order to observe a high magnification, it is forced to purchase another more expensive high-magnification sight.

The above-described technical configuration is a background technique for assisting the understanding of the present invention, and does not mean a conventional technology widely known in the art to which the present invention belongs.

SUMMARY OF THE INVENTION

An object of the present invention is to provide an adaptor lens for increasing a magnification of a scope and a sight comprising the same which is easily attached to a low-magnification sight of a user to achieve a high magnification and is simpler and cheaper.

According to an aspect of the present invention, there is provided an adaptor lens for increasing a magnification of a scope comprising: an adapter lens body detachably coupled to a sight main body having an objective lens group; a convex lens part provided in the adapter lens body so as to be disposed in front of the objective lens group; and a concave lens part provided in the adapter lens body and disposed between the convex lens part and the objective lens group, wherein the convex lens part includes a first convex lens disposed in front of the objective lens group and a second convex lens disposed between the first convex lens and the concave lens part so as to be spaced apart from the first convex lens, an incident beam incident in parallel to the first convex lens decreases in diameter while sequentially passing through the first convex lens and the second convex lens to be transmitted to the concave lens part, and a diameter of an emission beam emitted in parallel through the second concave lens part is smaller than that of the incident beam.

A diameter of the first convex lens may be larger than that of the second convex lens and a diameter of the second convex lens may be larger than that of the concave lens part.

The concave lens part may comprise a first concave lens provided in the adapter lens body so as to be disposed behind the second convex lens; and a second concave lens provided in the adapter lens body so as to be disposed behind the first concave lens, wherein the first concave lens and the second concave lens are provided to be in contact with each other.

The first convex lens may a first unit convex lens provided in the adapter lens body so as to be disposed in front of the second convex lens; and a first unit concave lens provided in the adapter lens body so as to be disposed between the first unit convex lens and the second convex lens, wherein the first unit convex lens and the first unit concave lens are provided to be in contact with each other.

The concave lens part may comprise a first concave lens provided in the adapter lens body so as to be disposed behind the second convex lens; and a second concave lens provided in the adapter lens body so as to be disposed behind the first concave lens, wherein the first concave lens and the second concave lens are spaced apart from each other.

If a total focal length for an optical system is F and a lens aperture is D, $0 \le |D/F| \le 0.02$.

If a focal length of the convex lens part is f1, a focal length of the concave lens part is f2, and a magnification ratio of magnifying a magnification of the scope is m, it may be satisfied as $-1.1m \le f1/f2 \le -0.9m$.

The concave lens part may comprise a first concave lens provided in the adapter lens body so as to be disposed behind the second convex lens; and a second unit convex lens provided in the adapter lens body so as to be disposed behind the first concave lens, wherein the first concave lens and the second unit convex lens are spaced apart from each other.

The first concave lens and the second unit convex lens may be provided to be in contact with each other.

According to the embodiments of the present invention, even if a high-magnification sight is not additionally purchased, a high-magnification scope product may be ensured by purchasing only a cheaper adapter lens, thereby widening a customer's selection width.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
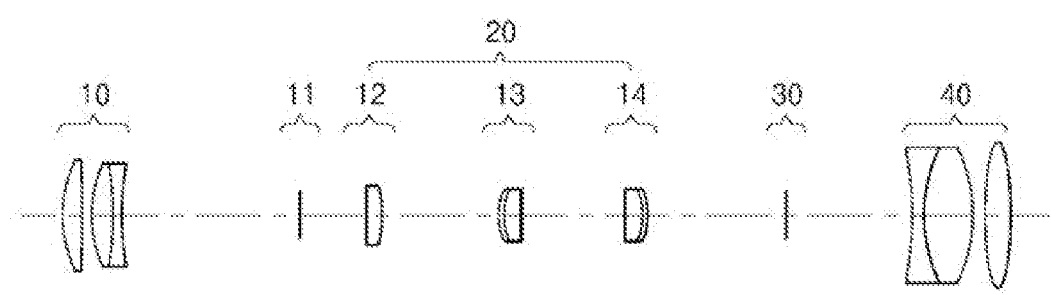
FIG. 1 is a view schematically illustrating a lens configuration of a zoom lens system of a sight.

In order to fully understand the present invention, operational advantages of the present invention and objects achieved by implementing the present invention, the prevent invention will be described with reference to the accompanying drawings which illustrate preferred exemplary embodiments of the present invention and the contents illustrated in the accompanying drawings.

Hereinafter, preferred exemplary embodiments of the present invention will be described in detail with reference to the accompanying drawings. Like reference numerals illustrated in the respective drawings designate like members.

Figure 3:
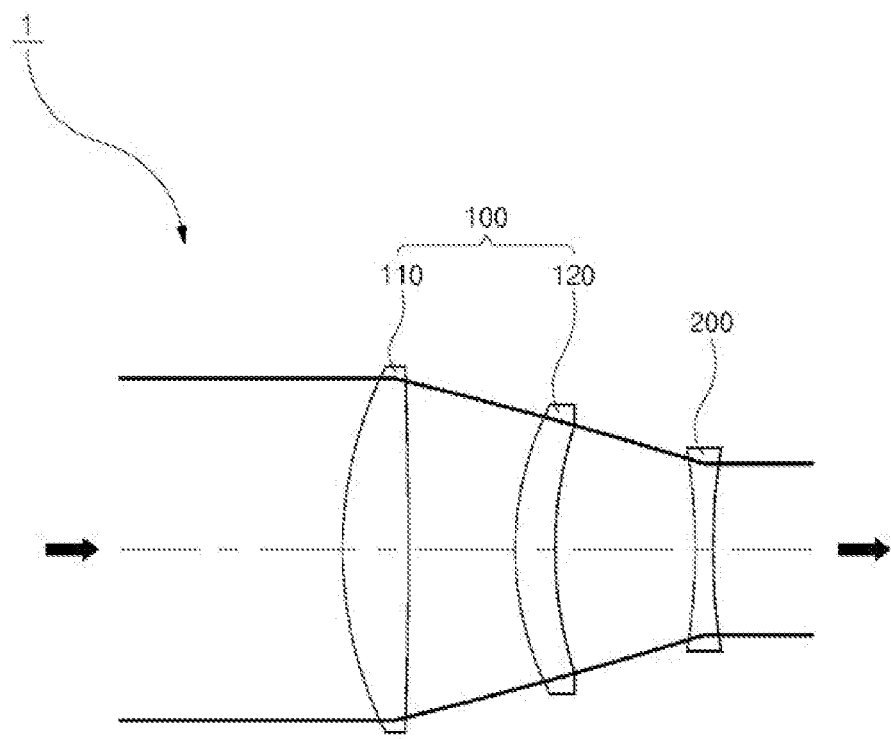
FIG. 3 is a view schematically illustrating an adapter lens for increasing a magnification of a scope according to a first embodiment of the present invention.
Figure 4:
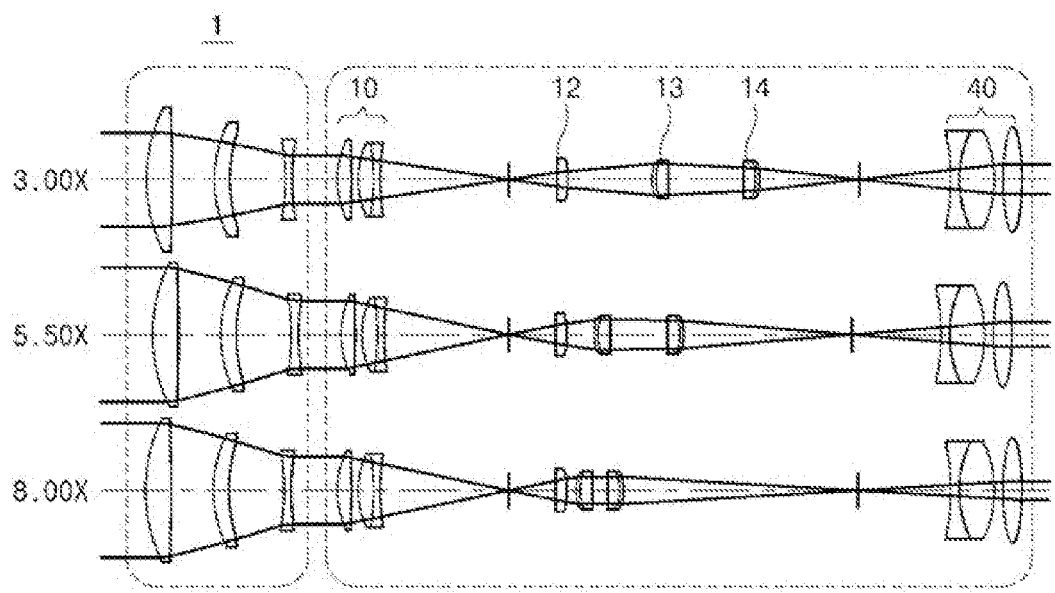
FIG. 4 is a view schematically illustrating that a higher magnification is implemented by disposing the adapter lens illustrated in FIG. 3 in front of an objective lens group.
Figure 5:
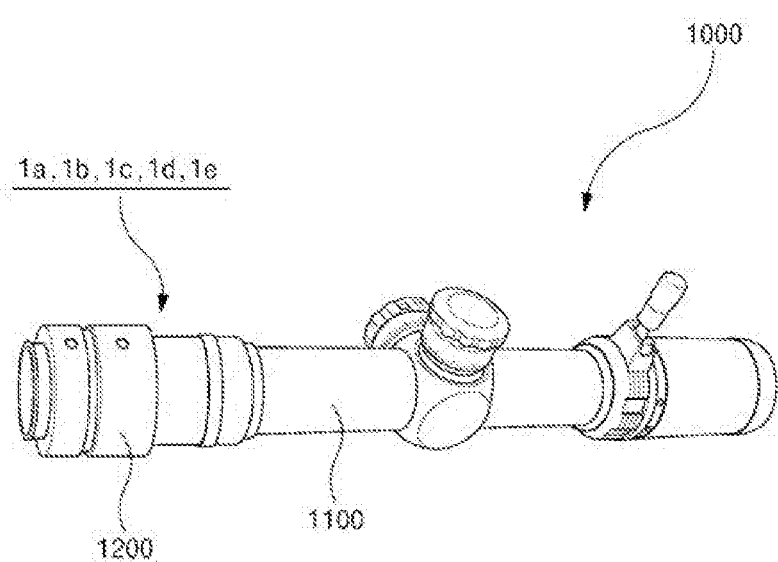
FIG. 5 is a view schematically illustrating a sight to which the adapter lens for increasing the magnification of the scope of the aforementioned embodiment is applied.

FIG. 3 is a view schematically illustrating an adapter lens for increasing a magnification of a scope according to a first embodiment of the present invention, FIG. 4 is a view schematically illustrating that a higher magnification is implemented by disposing the adapter lens illustrated in FIG. 3 in front of an objective lens group, and FIG. 5 is a view schematically illustrating a sight to which the adapter lens for increasing the magnification of the scope of the aforementioned embodiment is applied.

As illustrated in these drawings, an adapter lens 1 for increasing a magnification of a scope according to the present embodiment includes an adapter lens body 1200 detachably coupled to a sight main body 1100 having an objective lens group 10, a convex lens part 100 provided in the adapter lens body 1200 so as to be disposed in front of the objective lens group 10 and having positive (+) power, and a concave lens part 200 provided in the adapter lens body 1200 and disposed between the convex lens part 100 and the objective lens group 10 to have negative (−) power.

The adapter lens body 1200 is coupled to a front side of the sight main body 1100 as illustrated in FIG. 5 and the convex lens part 100 and the concave lens part 200 illustrated in FIG. 3 may be provided therein.

In the present embodiment, the adapter lens body 1200 may be detachably coupled, for example, screwed to the sight main body 1100. This may also be applied to second to sixth embodiments to be described below.

As illustrated in FIGS. 3 and 4, the convex lens part 100 is disposed in front of the concave lens part 200 and disposed to have positive (+) power to narrow a diameter of an incident beam incident from the front side of the convex lens part 100 and transmit the incident beam to the concave lens part 200.

In the present embodiment, as illustrated in FIG. 3, the convex lens part 100 includes a first convex lens 110 disposed in front of the objective lens group 10 and a second convex lens 120 disposed between the first convex lens 110 and the concave lens part 200 so as to be spaced apart from the first convex lens 110.

In the present embodiment, as illustrated in FIGS. 3 and 4, the incident beam incident in parallel to the first convex lens 110 decreases in diameter while sequentially passing through the first convex lens 110 and the second convex lens 120 to be transmitted to the concave lens part 200.

In this case, a diameter of an emission beam emitted in parallel through the second concave lens part 200 may be smaller than that of the incident beam incident through the first convex lens 110.

Previously, because of an optical system in which a parallel beam is incident and then emitted, the optical system may be referred to as an optical system in which a focal length is very long to have no power or very weak power.

Therefore, if a total focal length (E.F.L or effective focal length) of the optical system is F, $1/F \approx 0$.

In the present embodiment, the adapter lens 1 is disposed in front of the objective lens group 10 of the sight optical system as illustrated in FIG. 4 to implement a higher magnification and convert an original sight zoom magnification of 1.5× to 4.0× into a zoom magnification of 3× to 8× magnified by 2 times.

Figure 2:
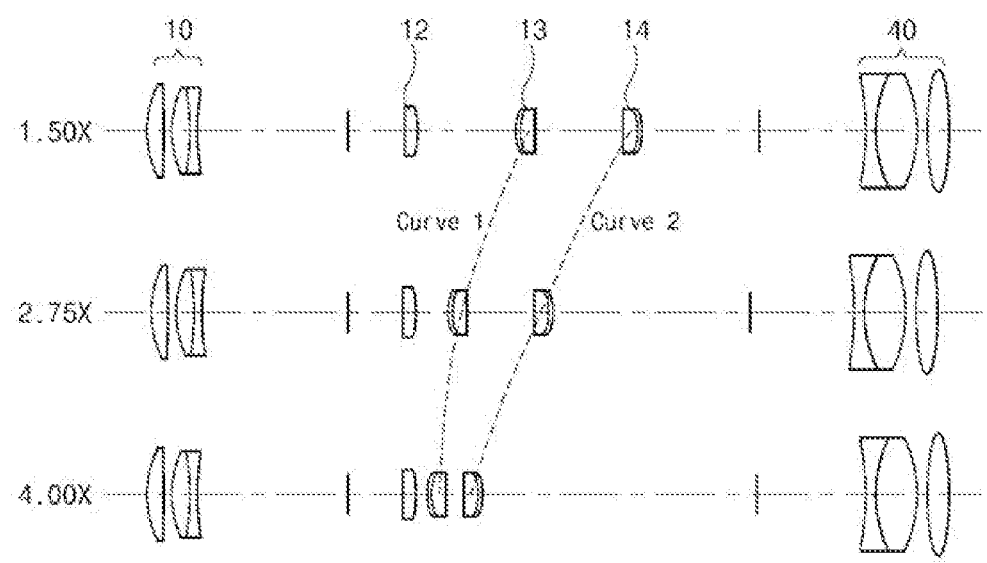
FIG. 2 is a view schematically illustrating that zooming is implemented at predetermined magnification sections of 1.5× to 4.0× of the zoom lens system illustrated in FIG. 1.

Lens design data for the adapter lens 1 for implementing the above-mentioned 2× magnification ratio may refer to Table 2. In this case, planes or distance numbers described in Table 2 may refer to FIGS. 1 and 2, which may also be applied to second to sixth embodiments to be described below.

When a focal length of the convex lens part 100 is f1 and a focal length of the concave lens part 200 is f2, it may be represented as $f1/f2 \approx -2$, and if a magnification ratio is m, it may be represented as $f1/f2 \approx -m$.

Figure 6:
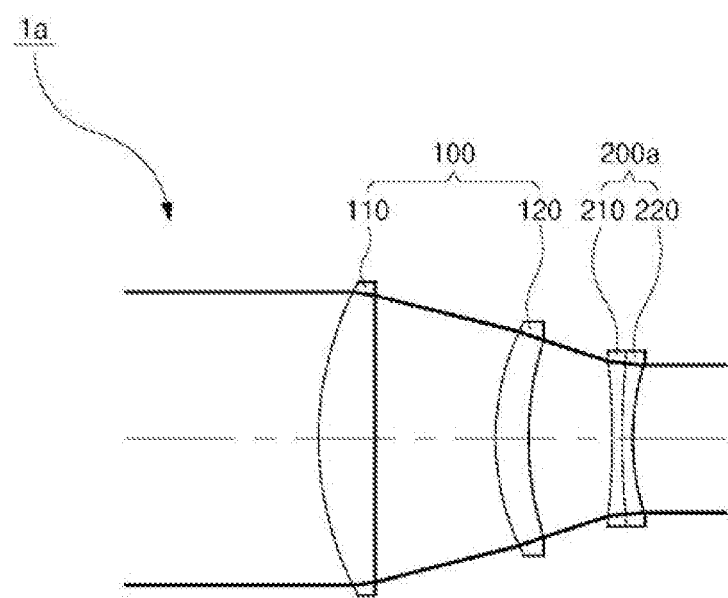
FIG. 6 is a view schematically illustrating an adapter lens for increasing a magnification of a scope according to a second embodiment of the present invention.

FIG. 6 is a view schematically illustrating an adapter lens for increasing a magnification of a scope according to a second embodiment of the present invention.

As illustrated in FIG. 6, there is a difference from the aforementioned embodiment in that an adapter lens 1a of the present embodiment is provided by bonding a first concave lens 210 and a second concave lens 220 of a concave lens part 200a to each other. In this case, design data is shown in Table 3 below.

That is, in the concave lens part 200a of the present embodiment, the first concave lens 210 and the second concave lens 220 having negative power are provided as a double cemented lens.

When a focal length of the convex lens part 100 having positive power is f1 and a focal length of the concave lens part 200a is f2, it may be represented as $f1/f2 \approx -2$, and if a magnification ratio is m, it may be represented as $f1/f2 \approx -m$. If the total focal length is F, $1/F \approx 0$.

TABLE 2

| Classification | Plane | Radius of curvature (mm) | Thickness or Distance (mm) | Effective radius (mm) | Refractive index | Dispersion coefficient |
|---|---|---|---|---|---|---|
| Adapter lens | R1 | 52.62 | 8.50 | 22.0 | 1.487 | 70.0 |
| | R2 | −561.00 | 13.90 | 22.0 | | |
| | R3 | 41.48 | 5.00 | 17.4 | 1.487 | 70.0 |
| | R4 | 53.82 | 18.01 | 16.3 | | |
| | R5 | −74.36 | 2.00 | 12.0 | 1.723 | 38.0 |
| | R6 | 45.88 | 15.00 | 11.6 | | |
| 1.5-4x Sight lens | r1 | 37.89 | 4.50 | 12.0 | 1.487 | 70.0 |
| | r2 | −101.00 | 2.50 | 12.0 | | |
| | r3 | 30.63 | 5.50 | 11.0 | 1.497 | 82.0 |
| | r4 | −50.29 | 1.60 | 12.0 | 1.723 | 38.0 |
| | r5 | 53.55 | 42.02 | 10.0 | | |
| | r6 | ∞ (First focal plane) | 15.95 | 5.6 | | |
| | r7 | −115.60 | 3.50 | 5.8 | 1.638 | 55.0 |
| | r8 | −25.51 (d8) | 28.044 | 6.0 | | |
| | r9 | 22.45 | 1.10 | 5.2 | 1.728 | 28.0 |
| | r10 | 11.47 | 4.00 | 6.0 | 1.517 | 64.0 |
| | r11 | −34.58 (d11) | 24.511 | 5.1 | | |
| | r12 | −295.30 | 4.00 | 5.0 | 1.517 | 64.0 |
| | r13 | −12.47 | 1.10 | 6.0 | 1.670 | 47.0 |
| | r14 | −23.96 (d14) | 32.516 | 5.3 | | |
| | r15 | ∞ (Second focal plane) | 30.16 | 7.7 | | |
| | r16 | −60.63 | 2.50 | 12.1 | 1.689 | 31.0 |
| | r17 | 32.13 | 12.00 | 15.5 | 1.517 | 64.0 |
| | r18 | −32.13 | 2.50 | 14.6 | | |
| | r19 | 60.40 | 6.00 | 15.7 | 1.517 | 64.0 |
| | r20 | −60.40 | 83.81 | 15.7 | | |

| Distance No. | 3.0x | 5.5x | 8.0x |
|---|---|---|---|
| d8 | 28.044 | 9.598 | 3.517 |
| d11 | 24.511 | 18.964 | 4.762 |
| d14 | 32.516 | 56.508 | 76.791 |

TABLE 3

| Plane | Radius of curvature (mm) | Thickness or Distance (mm) | Effective radius (mm) | Refractive index | Dispersion coefficient |
|---|---|---|---|---|---|
| R1 | 49.31 | 8.50 | 22.0 | 1.517 | 64.0 |
| R2 | ∞ | 18.00 | 21.5 | | |
| R3 | 38.23 | 5.00 | 16.2 | 1.490 | 70.0 |
| R4 | 50.48 | 12.53 | 15.1 | | |
| R5 | −83.95 | 1.50 | 12.2 | 1.755 | 27.5 |
| R6 | 187.70 | 1.50 | 11.9 | 1.660 | 54.0 |
| R7 | 38.48 | 15.00 | 11.6 | | |

| Distance No. | 3.0x | 5.5x | 8.0x |
|---|---|---|---|
| d8 | 28.044 | 9.598 | 3.517 |
| d11 | 24.511 | 18.964 | 4.762 |
| d14 | 32.516 | 56.508 | 76.791 |

1.5x to 4x sight lens data of Table 1 is omitted.

Figure 7:
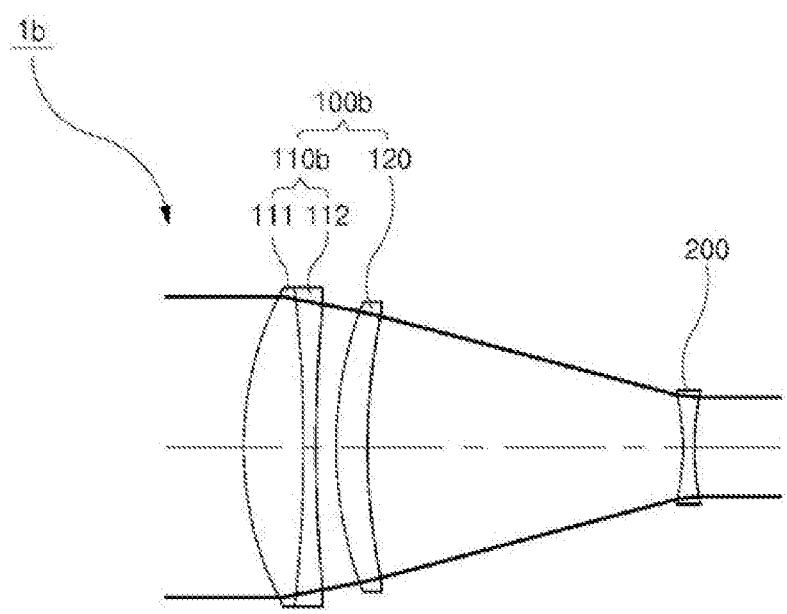
FIG. 7 is a view schematically illustrating an adapter lens for increasing a magnification of a scope according to a third embodiment of the present invention.

FIG. 7 is a view schematically illustrating an adapter lens for increasing a magnification of a scope according to a third embodiment of the present invention.

As illustrated in FIG. 7, there is a difference from the first embodiment in that in an adapter lens 1b according to the present embodiment, a first convex lens 110b of a convex lens part 100b is provided as a double cemented lens of a first unit convex lens 111 and a first unit concave lens 112.

In the present embodiment, it can be seen that if a focal length of the convex lens part 100b having positive power is f1 and a focal length of the concave lens part 200 having negative power is f2, a magnification ratio m is 3 in Formula of $f1/f2 \approx -m$.

In addition, it can be seen that if the total focal length is F, $1/F \approx 0$.

TABLE 4

| Plane | Radius of curvature (mm) | Thickness or Distance (mm) | Effective radius (mm) | Refractive index | Dispersion coefficient |
|---|---|---|---|---|---|
| R1 | 57.05 | 10.00 | 25.0 | 1.600 | 62.0 |
| R2 | −226.800 | 2.00 | 24.5 | 1.750 | 29.0 |
| R3 | 240.60 | 3.36 | 23.9 | | |
| R4 | 68.33 | 5.00 | 22.8 | 1.540 | 49.0 |
| R5 | 105.50 | 52.64 | 22.1 | | |
| R6 | −38.40 | 2.00 | 10.2 | 1.620 | 60.0 |
| R7 | 48.38 | 15.00 | 10.0 | | |

| Distance No. | 4.5x | 8.25x | 12.0x |
|---|---|---|---|
| d8 | 28.044 | 9.598 | 3.517 |
| d11 | 24.511 | 18.964 | 4.762 |
| d14 | 32.516 | 56.508 | 76.791 |

1.5x to 4x sight lens data of Table 1 is omitted.

Figure 8:
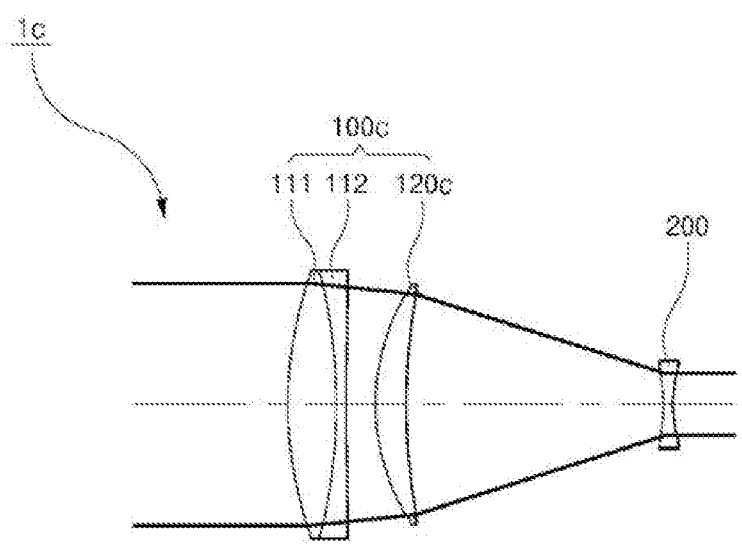
FIG. 8 is a view schematically illustrating an adapter lens for increasing a magnification of a scope according to a fourth embodiment of the present invention.

FIG. 8 is a view schematically illustrating an adapter lens for increasing a magnification of a scope according to a fourth embodiment of the present invention.

As illustrated in FIG. 8 and Table 5, there is a difference from the aforementioned third embodiment in that in an adapter lens 1c of the present embodiment, a radius of curvature of R4 of a second convex lens 120c is significantly reduced as compared with that of the aforementioned third embodiment.

In the present embodiment, it can be seen that if a focal length of the convex lens part 100c having positive power is f1 and a focal length of the concave lens part 200 having negative power is f2, a magnification ratio m is 4 in Formula of $f1/f2 \approx -m$.

In addition, it can be seen that if the total focal length is F, $1/F \approx 0$.

TABLE 5

| Plane | Radius of curvature (mm) | Thickness or Distance (mm) | Effective radius (mm) | Refractive index | Dispersion coefficient |
|---|---|---|---|---|---|
| R1 | 83.08 | 10.00 | 25.0 | 1.517 | 64.0 |
| R2 | −114.900 | 2.00 | 24.8 | 1.710 | 31.0 |
| R3 | 856.20 | 6.00 | 24.4 | | |
| R4 | 44.06 | 6.50 | 23.4 | 1.517 | 64.0 |
| R5 | 135.10 | 53.50 | 23.0 | | |
| R6 | −37.04 | 2.00 | 8.2 | 1.740 | 49.0 |
| R7 | 29.30 | 15.00 | 8.0 | | |

| Distance No. | 6.0x | 11.0x | 16.0x |
|---|---|---|---|
| d8 | 28.044 | 9.598 | 3.517 |
| d11 | 24.511 | 18.964 | 4.762 |
| d14 | 32.516 | 56.508 | 76.791 |

1.5x to 4x sight lens data of Table 1 is omitted.

Figure 9:
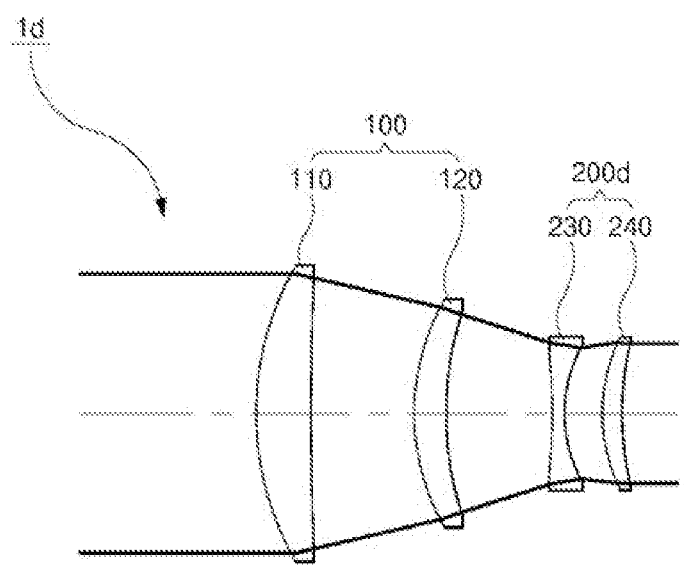
FIG. 9 is a view schematically illustrating an adapter lens for increasing a magnification of a scope according to a fifth embodiment of the present invention.

FIG. 9 is a view schematically illustrating an adapter lens for increasing a magnification of a scope according to a fifth embodiment of the present invention.

As illustrated in FIG. 9, there is a difference from the aforementioned first embodiment in that in an adapter lens 1d of the present embodiment, a concave lens part 200d having negative power is provided with a first concave lens 230 and a second unit convex lens 240 which are spaced apart from each other.

At this time, the first concave lens 230 may have negative power, the second unit convex lens 240 may have positive power, and the concave lens part 200d provided as the first concave lens 230 and the second unit convex lens 240 may have negative power.

In the present embodiment, it can be seen that if a focal length of the convex lens part 100 having positive power is f1 and a focal length of the concave lens part 200d having negative power is f2, a magnification ratio m is 2 in Formula of $f1/f2 \approx -m$.

In addition, it can be seen that if the total focal length is F, $1/F \approx 0$.

TABLE 6

| Plane | Radius of curvature (mm) | Thickness or Distance (mm) | Effective radius (mm) | Refractive index | Dispersion coefficient |
|---|---|---|---|---|---|
| R1 | 47.74 | 8.50 | 22.0 | 1.490 | 70.0 |
| R2 | 596.300 | 16.40 | 21.4 | | |
| R3 | 36.54 | 5.00 | 16.8 | 1.490 | 70.0 |
| R4 | 52.45 | 16.80 | 15.7 | | |
| R5 | −168.30 | 2.00 | 11.4 | 1.730 | 37.0 |
| R6 | 21.65 | 6.00 | 10.7 | | |
| R7 | 26.32 | 3.00 | 11.9 | 1.580 | 42.0 |
| R8 | 46.73 | 10.00 | 11.8 | | |

| Distance No. | 3.0x | 5.5x | 8.0x |
|---|---|---|---|
| d8 | 28.044 | 9.598 | 3.517 |
| d11 | 24.511 | 18.964 | 4.762 |
| d14 | 32.516 | 56.508 | 76.791 |

1.5x to 4x sight lens data of Table 1 is omitted.

Figure 10:
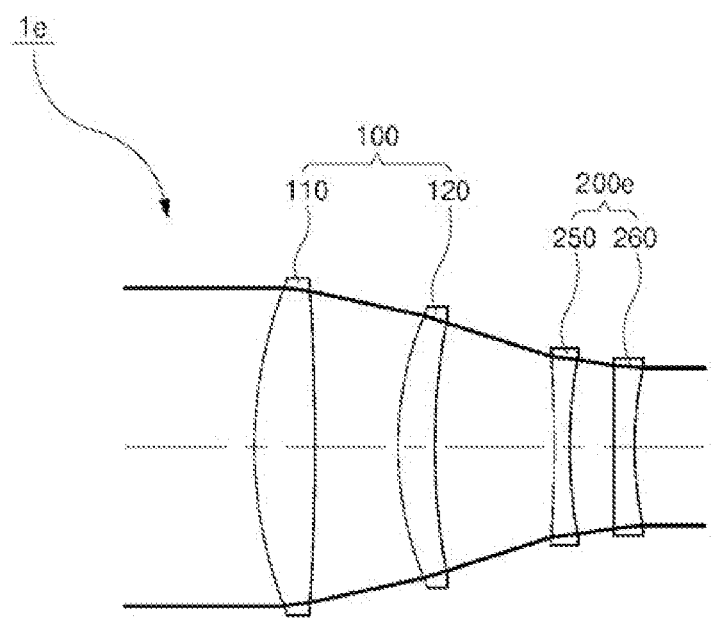
FIG. 10 is a view schematically illustrating an adapter lens for increasing a magnification of a scope according to a sixth embodiment of the present invention.

FIG. 10 is a view schematically illustrating an adapter lens for increasing a magnification of a scope according to a sixth embodiment of the present invention.

As illustrated in FIG. 10, there is a difference from the aforementioned fifth embodiment in that in an adapter lens 1e of the present embodiment, a concave lens part 200e having negative power is provided with a first concave lens 250 and a second concave lens 260 which are spaced apart from each other.

At this time, both the first concave lens 250 and the second concave lens 260 may have negative power.

In the present embodiment, it can be seen that if a focal length of the convex lens part 100 having positive power is f1 and a focal length of the concave lens part 200e having negative power is f2, a magnification ratio m is 2 in Formula of f1/f2≈−m.

In addition, it can be seen that if the total focal length is F, 1/F≈0.

TABLE 7

| Plane | Radius of curvature (mm) | Thickness or Distance (mm) | Effective radius (mm) | Refractive index | Dispersion coefficient |
|---|---|---|---|---|---|
| R1 | 64.00 | 8.50 | 22.0 | 1.490 | 70.0 |
| R2 | −323.400 | 11.50 | 21.5 | | |
| R3 | 47.56 | 5.00 | 18.2 | 1.490 | 70.0 |
| R4 | 94.70 | 16.70 | 17.4 | | |
| R5 | −196.50 | 2.00 | 13.0 | 1.720 | 34.0 |
| R6 | 69.23 | 6.00 | 12.5 | | |
| R7 | ∞ | 3.00 | 12.0 | 1.620 | 60.0 |
| R8 | 51.44 | 10.00 | 11.7 | | |

| Distance No. | 3.0x | 5.5x | 8.0x |
|---|---|---|---|
| d8 | 28.044 | 9.598 | 3.517 |
| d11 | 24.511 | 18.964 | 4.762 |
| d14 | 32.516 | 56.508 | 76.791 |

1.5x to 4x sight lens data of Table 1 is omitted.

As described above, according to the exemplary embodiments, even if a high-magnification sight is not additionally purchased, a high-magnification scope product may be ensured by purchasing only a cheaper adapter lens, thereby widening a customer's selection width.

As described above, the present invention is not limited to the present embodiments described herein, and it would be apparent to those skilled in the art that various changes and modifications might be made without departing from the spirit and the scope of the present invention. Therefore, it will be determined that the changed examples or modified examples are included in the appended claims of the present invention.

What is claimed is:

1. An adapter lens for increasing a magnification of a scope comprising:
    an adapter lens body detachably coupled to a sight main body having an objective lens group;
    a convex lens part provided in the adapter lens body so as to be disposed in front of the objective lens group; and
    a concave lens part provided in the adapter lens body and disposed between the convex lens part and the objective lens group,
    wherein the convex lens part includes a first convex lens disposed in front of the objective lens group and a second convex lens disposed between the first convex lens and the concave lens part so as to be spaced apart from the first convex lens,
    an incident beam incident in parallel to the first convex lens decreases in diameter while sequentially passing through the first convex lens and the second convex lens to be transmitted to the concave lens part, and
    a diameter of an emission beam emitted in parallel through the concave lens part is smaller than that of the incident beam,
    wherein if a total focal length for an optical system is F and a lens aperture is D, 0≤|D/F|≤0.02.

2. The adapter lens for increasing the magnification of the scope of claim 1, wherein a diameter of the first convex lens is larger than that of the second convex lens and a diameter of the second convex lens is larger than that of the concave lens part.

3. The adapter lens for increasing the magnification of the scope of claim 2, wherein the concave lens part comprises
    a first concave lens provided in the adapter lens body so as to be disposed behind the second convex lens; and
    a second concave lens provided in the adapter lens body so as to be disposed behind the first concave lens,
    wherein the first concave lens and the second concave lens are provided to be in contact with each other.

4. The adapter lens for increasing the magnification of the scope of claim 2, wherein the first convex lens comprises
    a first unit convex lens provided in the adapter lens body so as to be disposed in front of the second convex lens; and
    a first unit concave lens provided in the adapter lens body so as to be disposed between the first unit convex lens and the second convex lens,
    wherein the first unit convex lens and the first unit concave lens are provided to be in contact with each other.

5. The adapter lens for increasing the magnification of the scope of claim 2, wherein the concave lens part comprises
    a first concave lens provided in the adapter lens body so as to be disposed behind the second convex lens; and
    a second concave lens provided in the adapter lens body so as to be disposed behind the first concave lens,
    wherein the first concave lens and the second concave lens are spaced apart from each other.

6. The adapter lens for increasing the magnification of the scope of claim 2, wherein the concave lens part comprises
    a first concave lens provided in the adapter lens body so as to be disposed behind the second convex lens; and
    a second unit convex lens provided in the adapter lens body so as to be disposed behind the first concave lens,
    wherein the first concave lens and the second unit convex lens are spaced apart from each other.

7. The adapter lens for increasing the magnification of the scope of claim 6, wherein the first concave lens and the second unit convex lens are provided to be in contact with each other.

8. The adapter lens for increasing the magnification of the scope of claim 1, wherein if a focal length of the convex lens part is f1, a focal length of the concave lens part is f2, and a magnification ratio of magnifying a magnification of the scope is m, it is satisfied as −1.1m≤f1/f2≤−0.9m.

* * * * *